No. 693,121. Patented Feb. 11, 1902.
J. F. DORNFELD.
MALT KILN.
(Application filed Feb. 20, 1901.)
(No Model.)
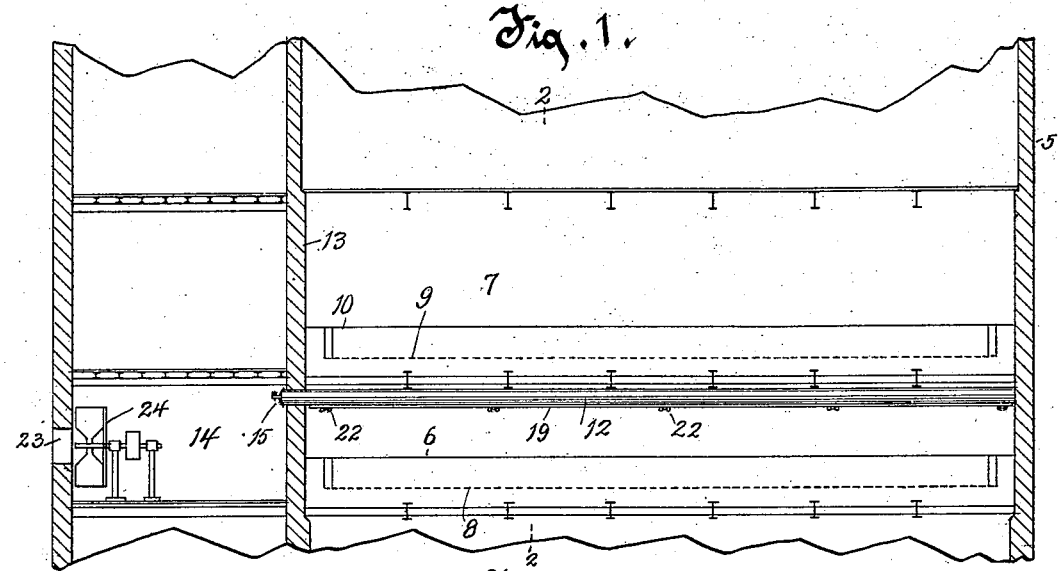
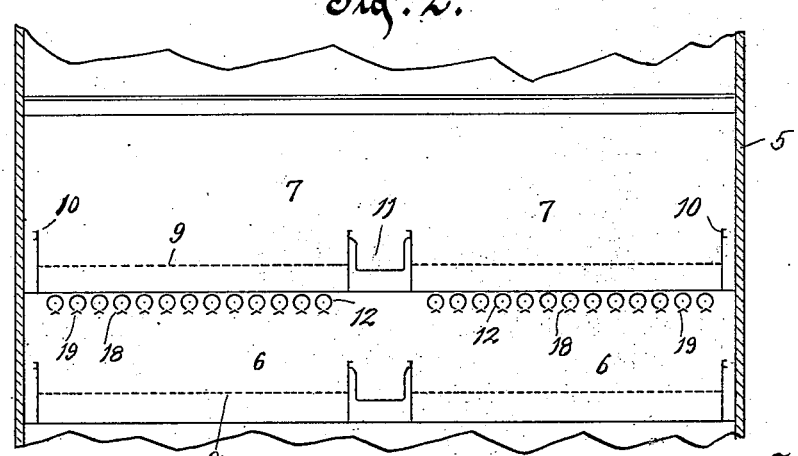
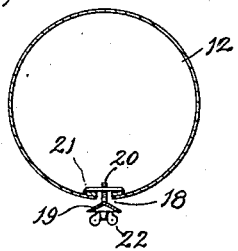
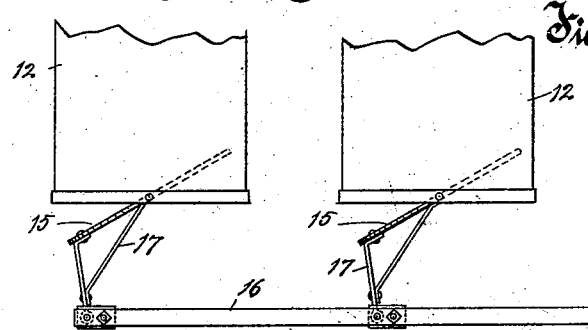
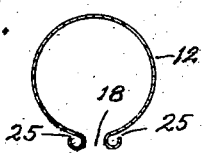
Witnesses:
Inventor:
John F. Dornfeld.
By Benedict & Morsell
Attorneys.

UNITED STATES PATENT OFFICE.

JOHN F. DORNFELD, OF MILWAUKEE, WISCONSIN.

MALT-KILN.

SPECIFICATION forming part of Letters Patent No. 693,121, dated February 11, 1902.

Application filed February 20, 1901. Serial No. 48,089. (No model.)

*To all whom it may concern:*

Be it known that I, JOHN F. DORNFELD, residing in Milwaukee, in the county of Milwaukee and State of Wisconsin, have invented a new and useful Improvement in Malt-Kilns, of which the following is a description, reference being had to the accompanying drawings, which are a part of this specification.

My invention has relation to improvements in malt-kilns.

In the accompanying illustrations of the invention the kiln is shown as arranged with two floors, one above the other, as in my United States Letters Patents for improvements in malting-kilns, No. 610,580, dated September 13, 1898. In this construction of malt-kilns the germinating malt from a malthouse is loaded on the upper floor once a day, where it remains for about twenty-four hours, when it is dumped down on the floor below, and the upper kiln-floor then reloaded with germinating malt, the same as the day before, and this process is repeated from day to day. After any batch of malt has been dumped from the upper floor onto the lower and the upper floor reloaded, as set forth, hot or warm air is drawn through both floors from the bottom up, passing through the lower floor first and thence through the malt on the upper floor and finally out. This warm or hot air is produced in a furnace (not shown herein) which may be similar to the furnace shown in my said Letters Patent No. 610,580, dated September 13, 1898, or may be a furnace located in an adjoining building. After having dumped the malt which was on the upper floor onto the lower floor and reloaded the upper floor it is necessary that the drying of these batches of malt should begin. The warm or hot air, therefore, from the furnace will first pass through the floors at a certain desired temperature and is permitted to continue to pass through the malt at this temperature for about ten hours, after which it is gradually raised to a higher temperature and at which time, being at the end of fifteen or twenty hours from the beginning, the drying of the malt on the lower floor must be finished. To accomplish this, a much higher temperature is required, in some cases a temperature as high as 180° Fahrenheit for a period of from three to seven hours. This air necessarily is much too hot to pass through the semidried malt which is at that time on the upper floor. As before stated, the temperature of the air for the drying up to the time when the lower batch was to be finished was much lower, and at this lower temperature the upper batch should be kept, notwithstanding the much higher temperature to which it is necessary to raise the air for finishing the lower batch, as otherwise the malt on the upper floor would be spoiled or, in other words, baked or boiled into a mushy condition.

It is the primary object of my invention to reduce the temperature of the air which has been raised for finishing the drying of the malt on the lower floor before said air reaches the upper floor, and to bring it to a proper temperature to prevent spoiling of the malt on the upper floor, and with this primary object in view the invention consists of the devices and parts, their combinations, or their equivalents, as hereinafter more fully set forth.

In the accompanying drawings, Figure 1 is a vertical section of a fragment of a malt-kiln equipped with my improvements. Fig. 2 is a section on the line 2 2 of Fig. 1. Fig. 3 is a cross-section of one of the air-pipes on an enlarged scale. Fig. 4 is a plan view of the ends of two of the air-pipes, showing the valve mechanism for regulating the ends of said pipe; and Fig. 5 is a cross-section of a modified form of air-pipe.

Referring to the drawings, the numeral 5 indicates a fragment of a building adapted for the use of my improvements, so much of the building being shown as to illustrate two malting-floors with two compartments on each floor; but the number of compartments employed is not essential, as only one compartment might be used or more than two, as might be deemed most desirable. The two lower compartments are indicated by the numerals 6 6 and the two upper compartments by the numerals 7 7.

The general form and construction of this malt-kiln is similar to that shown in my United Stated Letters Patent No. 610,580, dated September 13, 1898, hereinbefore referred to, it being understood that fans are preferably located in the upper portion of the kiln and a furnace in the lower portion thereof, as shown in said patent, the said fans being adapted to be continuously operated, excepting when the reloading of the upper floor is taking place, at which time they are checked or discontinued. In the building are shown the usual malting-floors, the lower one being indicated by the numeral 8 and the upper one by the numeral 9. The usual rails 10 10 form tracks for the travel of the stirring mechanism, (not shown,) and the central passages 11 are also shown.

My improvements consist in arranging beneath the upper malting-floor 9 a series of air-pipes 12, extending longitudinally of said floor and a short distance therebeneath. One end of each of these pipes extends through a partition-wall 13, which partition-wall, in conjunction with the adjacent outer wall of the building, forms a separate inclosed space 14. The ends of the pipe which protrude through this wall into the compartment 14 are open, and these open ends are preferably controlled by means of centrally-pivoted valves 15. These valves may be regulated in any desirable manner; but I prefer to employ for that purpose a long rod 16, said rod having a series of brackets 17 pivoted thereto, each bracket being connected to a valve in the manner clearly shown. The end of the rod is in convenient position to be reached by an operator, and it is obvious that when the rod is manipulated the valves are caused to close the open ends of the pipes, or only partially close the same, or fully open the same, in accordance with the extent and the direction of the movement of the rod. Each one of the pipes 12 is provided upon its under side and longitudinally thereof with an elongated opening 18. A valve 19, consisting of a long bar and preferably in the form of an inverted V, is carried loosely on a series of screw-stems 20, each stem extending upwardly and engaging a threaded opening in a bar 21, which extends lengthwise of and across the opening on the inside of the pipe. The outer end of each screw-stem has rigid therewith a wing-nut 22. It is obvious that by turning the screw-stems by means of the wing-nuts the valve is brought closer to or farther away from the opening. However, the raising and lowering of valve 19 may be done in many other ways and may be made automatic for all, if preferred.

My invention contemplates drawing fresh cool air into the space 14 at certain periods and permitting said air to pass into the pipes 12 and thence out of the openings of said pipes into the malting-compartment in order to mix and commingle with the hot air which is arising from the malt on the lower floor during the process of finishing the drying of said malt on the lower floor. The air can be drawn into the space 14 by any desirable means—as, for instance, the fans in the upper part of the malt-kiln may be depended upon for drawing air into the compartments by means of suction. I prefer, however, to provide the side wall of the building with an opening 23 and so locate an ordinary suction-fan 24 in the space 14 as to draw the exterior air into said space, the fan 24 then forcing the air from the space into the pipes.

The operation of my invention will now be explained. During the time the malt is going through the initiatory stage of drying on the several malting-floors the valves 15 are adjusted so as to entirely close up the open ends of the pipes 12, and the suction-fan 24 is also out of operation. When, however, the temperature of the air from the furnace is raised to the high point to effect the finishing of the drying of the malt on the lower floor, then the valves 15 are opened by properly manipulating the rod 16 and the fan 24 set in motion. The valves 19 are also properly adjusted so as to open the openings 18. When the fan 24 is thus set in operation, the exterior air will be forced into the pipes 12 and discharged from said pipes through the openings 18 thereof, and before the hot air arising from the furnace has an opportunity to pass through the malt on the upper floor it encounters this cool fresh air issuing from the openings 18, and is thereby cooled to the proper degree. When the drying of the malt on the lower floor is finished, after a certain period of time the valves 15 are again closed and the operation of the fan 24 stopped. The quantity of air passing into the tubes may be regulated by the operation of the fan.

The valves 19 are preferably of the inverted-V shape form shown, so as to deflect the fresh air, and thereby more thoroughly mix and commingle the same with the rising hot air. If these valves were not of the form shown, some of the heated air might pass upwardly through the space between two of the pipes and pass through the perforations of the upper malting-floor 9 without having encountered any of the cool air.

It is of course obvious that my invention is applicable to a building containing any number of floors, and that in such case it is only necessary to duplicate the arrangement of the pipes 12 in all of the several upper floors.

By providing the adjustment for the valves 19 these valves may be forced closer to or farther away from the openings 18, so as to restrict said openings or enlarge said openings, and thereby regulate the amount of air issuing therefrom, whereby the temperature of the hot air may be regulated in a very simple manner, it being obvious that the farther away the valves 19 are from the openings 18 the greater will be the volume of cool air issuing therethrough, while when said valves are adjusted closer to the openings the said openings are restricted to that extent, and consequently the volume of cool air passing thereout is diminished and the heated air is not cooled to the same extent.

While I have herein shown and described a series of separate pipes 12, yet I do not wish to be understood as restricting myself thereto, inasmuch as it is obvious that a single wide air-chamber provided with openings upon its under side could be employed and successful results obtained without departing from the spirit and scope of my invention.

While the invention described and shown has the pipes under an upper and over a lower floor, the same can be used under a lower floor for regulating and attemperating air from a furnace.

In Fig. 5 of the drawings I show a slightly-modified form of the air-pipe 12. This consists in turning upwardly the metal at the side edges of the opening 18 to form two lower longitudinal side channels or gutters 25 25. It is evident that the cold air passing through the pipes 12 and the upwardly-rising air from the furnace will cause the pipes 12 to sweat or a considerable amount of moisture to form thereon, which, if no means were provided to guard against it, would cause dripping from the pipes 12, to the detriment of the successful operation of my device. The channels 25 form an effective means for catching the drippings, and hence obviate the trouble referred to.

What I claim as my invention is—

1. In a malt-kiln, the combination with a building having upper and lower perforated malting-floors through which heated air is adapted to pass, of an air-conduit arranged beneath the upper malting-floor, said conduit provided with a discharge-opening, means for feeding cool air into the conduit at certain times and for discharging admitted air from the conduit, said discharged air adapted to commingle with the air which has passed through the malt contained on the lower malting-floor before said air passes through the upper malting-floor, means for shutting off the admission of air into the conduit and for controlling the discharge-opening of the conduit, and means for adjusting the discharge-opening in order to regulate the amount of air issuing out of said opening.

2. In a malt-kiln, the combination with a building having upper and lower perforated malting-floors through which heated air is adapted to pass, of an air-conduit arranged beneath the upper malting-floor, said conduit provided with a discharge-opening, means for feeding cool air into the conduit at certain times and for discharging said admitted air from the conduit, in order to commingle with the air which has passed through the malt contained on the lower malting-floor before said air passes through the upper malting-floor, means for shutting off the admission of air into the conduit, a valve for controlling the discharge-opening of the conduit, and means for adjusting said valve in order to regulate the amount of air issuing out of the opening.

3. In a malt-kiln, the combination with a building having upper and lower perforated malting-floors, and through which floors air at a certain temperature is adapted to pass, of an air-conduit arranged beneath the upper malting-floor, said conduit provided with a discharge-opening, means for feeding cool air into the conduit at certain times and for discharging said admitted air from the conduit, in order to commingle with the air which has passed through the malt contained on the lower malting-floor before said air passes through the upper malting-floor, means for shutting off the admission of air into the conduit, a valve for controlling the opening of the conduit, and a screw-stem on which the valve is carried, one end of said stem engaging the threaded opening of a bar extending lengthwise of the valve-opening and on the inside of the pipe.

4. In a malt-kiln, the combination with a building having upper and lower perforated malting-floors through which heated air is adapted to pass, of an air-conduit arranged beneath the upper malting-floor, said conduit provided with a discharge-opening, means for feeding cool air into the conduit at certain times and for discharging said admitted air from the conduit, in order to commingle with the air which has passed through the malt contained on the lower malting-floor before said air passes through the upper malting-floor, means for shutting off the admission of air into the conduit, and a valve for controlling the discharge-opening of the conduit, said valves being of an inverted-V shape in order to act as a deflector for the air passing out of said openings.

5. In a malt-kiln, the combination with a building having upper and lower perforated malting-floors through which heated air is adapted to pass, of conduits arranged beneath the upper malting-floor, said conduits each provided with an open end, and in its length with a discharge-opening, a pivoted valve at the open end of each conduit, and mechanism connected to all of said several valves and adapted, when operated, to simultaneously turn the valves to open position in order to admit a quantity of cool air into the conduits, said air adapted to pass out of the pipes through the discharge-openings thereof.

6. In a malt-kiln, the combination with a building having one or more perforated malting-floors therein through which heated air is adapted to pass, of a series of pipes arranged beneath a malting-floor, each of said pipes having an open end, and provided longitudinally with a discharge-opening, adjustable valves for regulating the discharge-openings of the pipes, and means for regulating the air to the open ends of the pipes.

7. In a malt-kiln, the combination with a building having a perforated malting-floor through which floor heated air is adapted to pass, of an air-conduit arranged beneath the malting-floor, said conduit provided longitudinally with a discharge-opening, and also with a drip channel or channels, means for feeding cool air into the conduit at certain times, and for discharging said admitted air from the conduit in order to commingle with all the heated air throughout the kiln before it passes through the malting-floor above, and means for shutting off the admission of air into the conduit.

In testimony whereof I affix my signature in presence of two witnesses.

JOHN F. DORNFELD.

Witnesses:
A. L. MORSELL,
ANNA V. FAUST.